United States Patent
Shoji et al.

(10) Patent No.: US 6,733,545 B2
(45) Date of Patent: May 11, 2004

(54) SOLID ELECTROLYTIC CAPACITOR AND METHOD OF MANUFACTURING THE SAME

(75) Inventors: Masashi Shoji, Osaka (JP); Seigo Shiraishi, Hirakata (JP); Emiko Igaki, Amagasaki (JP); Masakazu Tanahashi, Osaka (JP); Mikinari Shimada, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/162,463

(22) Filed: Jun. 3, 2002

(65) Prior Publication Data

US 2002/0149903 A1 Oct. 17, 2002

Related U.S. Application Data

(62) Division of application No. 09/829,303, filed on Apr. 9, 2001, now Pat. No. 6,426,866.

(30) Foreign Application Priority Data

Apr. 14, 2000 (JP) ........................................ 2000-113731

(51) Int. Cl.[7] ................................................. H01G 9/04
(52) U.S. Cl. ...................................................... 29/25.03
(58) Field of Search ........................................ 29/25.03

(56) References Cited

U.S. PATENT DOCUMENTS

| | | | | |
|---|---|---|---|---|
| 4,959,753 A | | 9/1990 | Kudoh et al. | |
| 5,571,392 A | * | 11/1996 | Sato et al. | 204/296 |
| 5,654,869 A | * | 8/1997 | Ohi et al. | 361/540 |
| 6,036,734 A | * | 3/2000 | Taketani et al. | 29/25.03 |
| 6,280,879 B1 | * | 8/2001 | Andersen et al. | 429/233 |
| 6,310,765 B1 | * | 10/2001 | Tanahashi et al. | 361/516 |
| 6,375,688 B1 | * | 4/2002 | Akami et al. | 29/25.03 |
| 6,413,282 B1 | * | 7/2002 | Tanahashi et al. | 29/25.03 |
| 6,491,733 B2 | * | 12/2002 | Terada et al. | 29/25.03 |
| 6,519,137 B1 | * | 2/2003 | Nitta et al. | 361/525 |
| 2001/0003501 A1 | * | 6/2001 | Hayashi et al. | 361/523 |
| 2003/0032053 A1 | * | 2/2003 | Fukushima et al. | 438/1 |

FOREIGN PATENT DOCUMENTS

| | | |
|---|---|---|
| EP | 886 288 | 12/1998 |
| JP | 6-82594 | 10/1994 |
| JP | 11-219861 | 8/1999 |

* cited by examiner

*Primary Examiner*—George Fourson
*Assistant Examiner*—Joannie Adelle Garcia
(74) *Attorney, Agent, or Firm*—Merchant & Gould P.C.

(57) ABSTRACT

There is provided a solid electrolytic capacitor including an anode body formed of a valve-action metal with a dielectric oxide coating layer formed on its surface, a cathode body, and an electroconductive polymer layer disposed between the anode body and the cathode body. The electroconductive polymer layer contains a softener for softening the electroconductive polymer layer, so that a solid electrolytic capacitor is provided that has small variations in characteristics, a lower equivalent series resistance (ESR), and an excellent high frequency property. In addition, when the anode and cathode of a solid electrolytic capacitor including an electroconductive polymer as a solid electrolyte are joined to each other, a lower ESR can be obtained under a lower pressure, and the electroconductive polymer layer can be prevented from being peeled off.

16 Claims, 5 Drawing Sheets

SOLID ELECTROLYTIC CAPACITOR AND METHOD OF MANUFACTURING THE SAME

BACKGROUND OF THE INVENTION

1. Field of the Invention

The present invention relates generally to a solid electrolytic capacitor with a valve-action metal such as aluminum, tantalum, or the like used for an anode and an electroconductive polymer used for a solid electrolyte, and to a method of manufacturing the same.

2. Related Background Art

Conventionally, solid electrolytic capacitors have been used widely in computers, portable telephones, and the like.

FIG. 5 shows a configuration of a conventional solid electrolytic capacitor with a valve-action metal used as an anode. In FIG. 5, numeral 5 indicates a valve-action metal porous body, numeral 6 a dielectric oxide coating, numeral 7 a solid electrolyte layer, numeral 8 a carbon layer, numeral 9 a silver (Ag) paste layer, numeral 10 an anode leading-out terminal, and numeral 11 a cathode leading-out terminal. Initially, the dielectric oxide coating 6 is formed on a surface of the valve-action metal porous body 5 such as aluminum with a roughened surface, powder-sintered tantalum, or the like. Next, an electroconductive polymer such as polypyrrole, manganese dioxide, or the like is formed on the surface of the dielectric oxide coating 6 as the solid electrolyte layer 7. Subsequently, a cathode layer including the carbon layer 8, the silver paste layer 9, and the like is formed on the solid electrolyte layer 7. Thus, a capacitor element is produced. Afterward, the anode leading-out terminal 10 is attached to an anode lead part by welding or the like and the cathode leading-out terminal 11 is attached to the cathode layer with a conductive adhesive. Finally, a package (not shown in the figure) is formed to cover the whole capacitor element except for parts of the anode and cathode leading-out terminals. Thus, a solid electrolytic capacitor is obtained. The package serves for maintaining airtightness from the outside. Generally, the package is a tip type package formed with a mold using an epoxy-based thermosetting resin containing a silicon oxide filler or the like, or a lead wire type package formed by dipping. With this configuration, in order to obtain a lower equivalent series resistance (ESR), it is necessary to increase the conductivity of the solid electrolyte layer and to give consideration to characteristics of the materials of the carbon layer and the silver paste layer and methods of forming them.

There is a solid electrolytic capacitor with a configuration in which an anode body and a cathode body are laminated so that an increased capacitance of the product and a lower ESR are obtained (JP 11(1999)-219861 A). In JP 11(1999)-219861 A, a method of manufacturing the solid electrolytic capacitor is proposed in which a solid electrolyte layer is connected directly to a cathode leading-out electrode. In a conventional solid electrolytic capacitor with an electroconductive polymer used for a solid electrolyte, in order to form the electroconductive polymer inside pores uniformly by increasing reaction resistance in a polymerization reaction and in order to improve the adhesive strength between an electroconductive polymer layer and a polymerized body when the electroconductive polymer is formed using an electrolyte (a polymeric monomer solution) by electrolytic polymerization, generally a binder resin is contained in the electrolyte (a polymeric monomer solution) as proposed in JP 1949637 (1995). Usually, such a binder resin also is contained in the electroconductive polymer layer.

Since a binder resin is contained in the electroconductive polymer layer of a conventional solid electrolytic capacitor, there has been a problem in that the resistance of the electroconductive polymer increases. On the other hand, when the binder resin is omitted to reduce the resistance, the electroconductive polymer layer is peeled off easily. In addition, even when the binder resin is present, the electroconductive polymer may be peeled off partially from a polymerized body during a drying step.

When a solid electrolytic capacitor is formed using a metal foil for a cathode body with an anode body and the cathode body connected directly with each other through an electroconductive polymer formed on the anode body, it is necessary to apply a sufficiently high pressure to secure sufficient adhesion of the electroconductive polymer so as to increase the connection area. Even when a pressure of 100 kgf/cm$^2$ is applied, an ESR of 10 mΩ or lower cannot be obtained (for an element effective area of 3×5 mm$^2$). In this case, when the pressure to be applied is low, the area where the metal foil as the cathode body and the electroconductive polymer are in contact with each other also is reduced and thus the contact resistance tends to increase.

Hence, in order to increase the contact area to lower the ESR, the package must be formed so that a high pressure is applied to the contact surface. However, it is difficult to form such a package, and there is a possibility that the dielectric oxide coating may be broken by the pressure.

SUMMARY OF THE INVENTION

In order to solve the conventional problems described above, it is an object of the present invention to provide a solid electrolytic capacitor with small variations in characteristics, a lower ESR, and an excellent high frequency property and to provide a method of manufacturing the same.

In order to achieve the above-mentioned object, a solid electrolytic capacitor of the present invention includes an anode body formed of a valve-action metal with a dielectric oxide coating layer formed on its surface; a cathode body; and an electroconductive polymer layer disposed between the anode body and the cathode body. The electroconductive polymer layer contains a softener for softening the electroconductive polymer layer.

A method of manufacturing a solid electrolytic capacitor, which includes an anode body formed of a valve-action metal with a dielectric oxide coating layer formed on its surface, a cathode body, and an electroconductive polymer layer disposed between the anode body and the cathode body, of the present invention includes: forming an electroconductive polymer layer on at least one electrode body selected from the anode body and the cathode body; impregnating the electroconductive polymer layer with a softener diluted with a low-boiling-point solvent to soften the electroconductive polymer layer; and evaporating the low-boiling-point solvent.

DETAILED DESCRIPTION OF THE INVENTION

Figure 1:
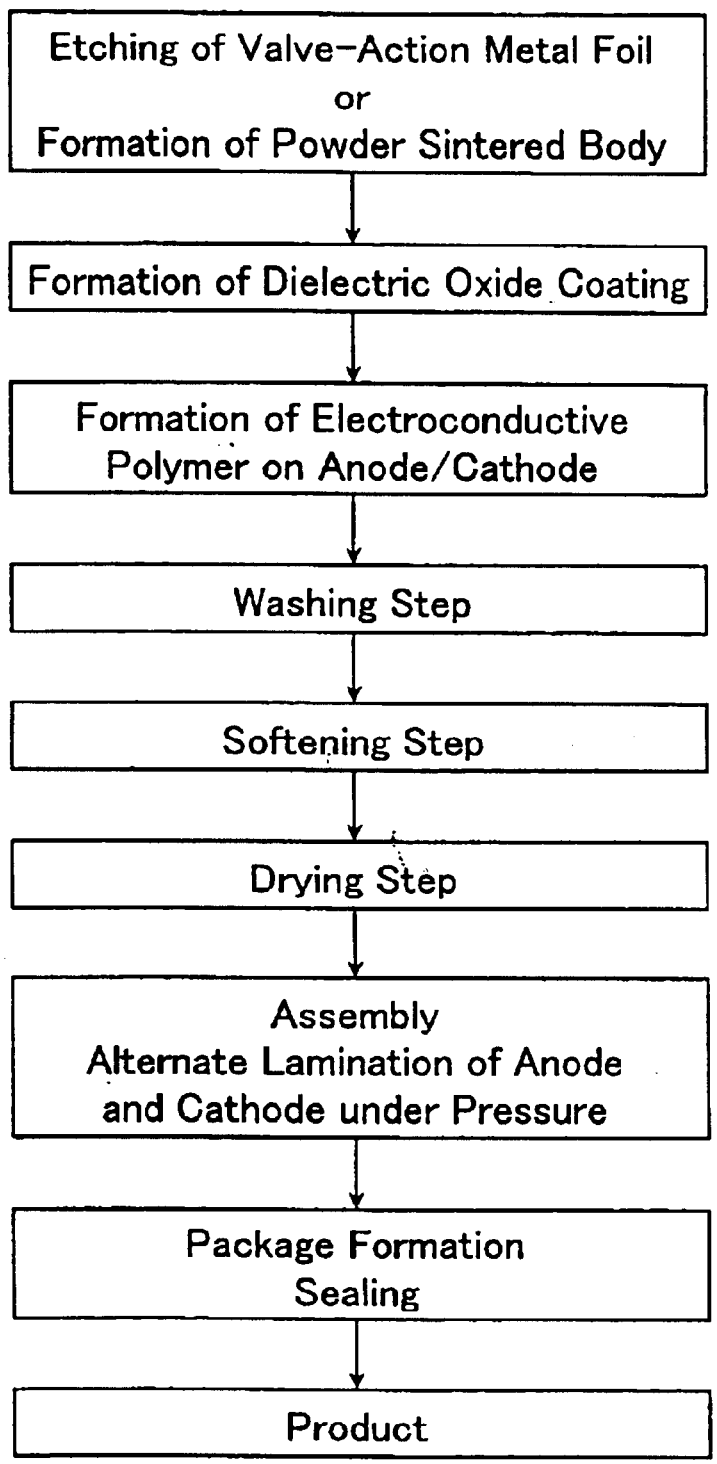
FIG. 1 is a flowchart showing a schematic method of manufacturing a solid electrolytic capacitor according to an example of the present invention.

In the solid electrolytic capacitor of the present invention, an electroconductive polymer layer formed on both or one of the anode body and the cathode body is impregnated with a softener, so that the electroconductive polymer is softened and thus the connection resistance can be reduced when the anode body and the cathode body are connected with each other with the electroconductive polymer interposed therebetween. This is because the electroconductive polymer and the anode body or the cathode body are brought easily into contact by their surfaces with each other due to the softening of the electroconductive polymer. Accordingly, the electroconductive polymer can be prevented from being peeled off.

In the present invention, preferably, the softener has a melting point not exceeding 30° C. and a boiling point of at least 200° C., further preferably at least 240° C., under a normal atmospheric pressure. The softener is, for example, at least one selected from polyhydric alcohols, fatty alcohols, aromatic alcohols, phenols, and ethers. More specifically, it is preferable that the softener is at least one selected from glycerin (with a boiling point of 290.5° C.), diethylene glycol (with a boiling point of 245.8° C.), 2-anilinoethanol, m-methoxyphenol, and ethylene glycol monobenzyl ether.

Preferably, the softener is blended in a ratio of 5.0 wt. % in the electroconductive polymer layer.

In the present invention, it is preferable that the electroconductive polymer layer contains no binder resin.

In the method of the present invention, preferably, the low-boiling-point solvent has a boiling point not exceeding 150° C. under normal atmospheric pressure. Preferably, the low-boiling-point solvent is at least one selected from methyl alcohol, ethanol, isopropyl alcohol, acetone, toluene, and xylene. It also is preferable that the low-boiling-point solvent has a drying temperature not exceeding 150° C. under normal atmospheric pressure. Preferably, the softener has a boiling point of at least 200° C. under the normal atmospheric pressure. Further preferably, the softener has a boiling point of at least 240° C. under normal atmospheric pressure. It is preferable that the softener is at least one selected from polyhydric alcohols, fatty alcohols, aromatic alcohols, phenols, and ethers. In addition, preferably, the softener is at least one selected from glycerin, diethylene glycol, 2-anilinoethanol, m-methoxyphenol, and ethylene glycol monobenzyl ether. Moreover, it is preferable that the softener is blended in a ratio of 5.0 wt. % in the electroconductive polymer layer.

In the method of the present invention, when the electroconductive polymer layer is formed with an electrolyte (a monomer solution for forming a polymer) containing no binder resin, there is a high possibility that the electroconductive polymer layer may be peeled off at a drying step after the formation. Therefore, it is desirable to carry out a step of impregnating the electroconductive polymer layer with the softener before the drying step.

Furthermore, in the solid electrolytic capacitor of the present invention, the softener may be any materials as long as they soften the polymer layer through the impregnation of the polymer layer with them, but typically, it is preferable that the softener is glycerin.

In the solid electrolytic capacitor of the present invention, preferably, an electroconductive polymer contains no binder resin, so that the resistance of the electroconductive polymer itself and the interface resistance decrease and thus the ESR of the capacitor decreases.

In the solid electrolytic capacitor of the present invention, the cathode body may be formed of a carbon layer or a silver paste layer, or may be formed of a metal foil.

The solid electrolytic capacitor and the method of manufacturing a solid electrolytic capacitor according to the present invention allow a solid electrolytic capacitor with a lower ESR and an excellent high frequency property to be obtained.

Embodiments of the present invention are described in detail as follows.

In a solid electrolytic capacitor of the present invention, an anode is formed of a valve-action metal. Preferably, aluminum, tantalum, or niobium is used as the valve-action metal. The valve-action metal is a porous body having a number of minute holes or pores leading to the exterior.

When being made of, for example, aluminum, the anode is a porous body formed of an aluminum foil roughened by electrolytic etching or the like to be provided with a number of small holes. When being made of, for example, tantalum, the anode is a porous body formed of tantalum powder that is press-formed and then sintered, or is a porous body formed of a tantalum sheet with tantalum powder applied thereto and then sintered.

A dielectric oxide coating layer is formed as an oxide coating on the surface of the valve-action metal porous body as an anode by anodic oxidation, so that an anodic body is obtained. This dielectric oxide coating layer also is formed on the surfaces of many minute holes in the anode porous body.

In the present invention, an electroconductive polymer material such as, for instance, polypyrrole, polythiophene, or polyaniline may be used as a solid electrolyte. This solid electrolyte layer is formed on the anode body and also is formed inside the minute holes of the porous body. This electroconductive polymer is not particularly limited in the present invention. Any electroconductive polymers may be used as long as they generally can be used for solid electrolytic capacitors.

In the solid electrolytic capacitor of the present invention, a cathode body is used for collecting electric charges extracted by the solid electrolyte layer. When a metal foil is used for the cathode body as an example, a Ni foil or an aluminum foil with carbon implanted in its surface is used with an electroconductive polymer formed on its surface by electrolytic polymerization or is used without requiring any further processing.

An electroconductive polymer layer is formed on the anode body and the anode body is connected to the cathode body with the electroconductive polymer layer interposed therebetween. Thus, a capacitor element for evaluation is configured. In this state, its characteristics as a capacitor can be evaluated with an impedance analyzer.

Using a metal foil for the cathode body, an arbitrary number of anode bodies with electroconductive polymer layers formed thereon and cathode bodies are laminated alternately under pressure to be connected with one another. Portions of the respective anode bodies where the electroconductive polymer layers are not formed are joined to each other by welding or the like. Portions of the cathode bodies that are not in contact with the anode bodies are joined to each other by welding or the like. A package is formed by molding using thermosetting resin such as epoxy so as not to contain parts of the anode body and the cathode body. Thus, a solid electrolytic capacitor is obtained.

In the present invention, the electroconductive polymer layers disposed between anode bodies and cathode bodies in the solid electrolytic capacitor are impregnated with a softener to be softened. Therefore, an electroconductive polymer layer located in a connection portion between an anode body and a cathode body becomes soft. Accordingly, the contact area between the anode and cathode bodies can be increased under a lower pressure in connecting the anode body and the cathode body and thus contact resistance can be reduced.

In the solid electrolytic capacitor of the present invention, the electroconductive polymer layer is formed by electrolytic polymerization using an electrolyte (a polymeric monomer solution) containing no binder resin. Accordingly, the electroconductive polymer layer contains no binder resin. Consequently, the resistance of the electroconductive polymer itself and connection resistance can be reduced and thus a solid electrolytic capacitor with a lower ESR can be obtained. In addition, the electroconductive polymer is moistened due to the softener and therefore is not peeled off. Thus, an effect of peeling prevention can be obtained in addition to the softening.

In this case, it is desirable that the softener used for softening the electroconductive polymer has a boiling point of at least 200° C. For example, when transfer molding or dip molding with resin is employed for the package formation, a heating process at 150° C. to 200° C. is carried out in a step of curing the resin. It is necessary for the softener not to be boiled off during such a step. Hence, when such a process is carried out, it is desirable that the softener has a boiling point of at least 200° C.

Furthermore, when the solid electrolytic capacitor of the present invention is mounted on a board by soldering or the like, the solid electrolytic capacitor is heat-treated at about 240° C. to 260° C. When any material that is gasified quickly in such a step is added to and is contained in the solid electrolytic capacitor, the air pressure inside the capacitor increases. Particularly, when the transfer molding or dip molding with resin is employed for the package formation, cracks may occur in the package so that the gas pressure is released. Consequently, it is desirable that the softener to be contained in the solid electrolytic capacitor has a boiling point of at least 260° C.

FIG. 1 shows an embodiment of a method of manufacturing the solid electrolytic capacitor according to the present invention described above.

Initially, an Al foil is etched electrolytically in an acid solution or a powder sintered body is formed with Ta powder as the step of forming the anode body described above. Next, a step of forming a dielectric oxide coating by anodic oxidation is carried out. Then, an electroconductive polymer is formed on both the anode and cathode bodies or on the anode alone. Afterward, a washing step is carried out using pure water and then the electroconductive polymer is softened with a softener (a softening step). Subsequently, a drying step is carried out and the anode and cathode bodies are laminated alternately under pressure, so that a capacitor part is formed. Then, an anode extraction lead and a cathode extraction lead may be connected in some cases. Finally, the capacitor part is sealed and thus a solid electrolytic capacitor is obtained. In this case, the number of alternately laminated anodes and cathodes is changed as required.

The process of softening the electroconductive polymer includes: a softening step in which a softener is diluted with a low-boiling-point solvent and the electroconductive polymer layer is impregnated with the dilution to be softened; and a drying step for evaporating the low-boiling-point solvent by heating. For peeling prevention, it is necessary to carry out the softening step before the electroconductive polymer is dried (before the drying step) directly after the electroconductive polymer is formed and is washed with pure water in the washing step. This allows the electroconductive polymer layer to be impregnated with the softener efficiently to be softened. In addition, in joining the anode and cathode bodies to each other with the electroconductive polymer layer interposed therebetween, the contact area between them can be increased under a lower pressure and this facilitates the step of forming the package. Since the electroconductive polymer layer can be prevented from being peeled off, the variations in characteristics of the solid electrolytic capacitor caused by the peeling off also can be avoided. As the method of softening the electroconductive polymer with a softener, the following methods also can be used: for example, a method in which vapor of a softener is produced and the electroconductive polymer portion is exposed to the vapor atmosphere, and a method in which a softener is dissolved in a solution for forming an electroconductive polymer.

In the step of forming an electroconductive polymer, the electroconductive polymer is formed by electrolytic polymerization with an electrolyte (a polymeric monomer solution) containing no binder resin, which generally is contained in an electrolyte.

According to the present invention, the electroconductive polymer to be formed between an anode body and a cathode body is formed by electrolytic polymerization with an electrolyte containing no binder resin, so that a lower ESR can be obtained as compared to that in a conventional solid electrolytic capacitor. In addition, a solid electrolyte layer formed of an electroconductive polymer is softened with higher alcohol or a softener, so that the electroconductive polymer can be prevented from being peeled off from electrode foils. According to the present invention, it is possible to produce a solid electrolytic capacitor with small variations in characteristics, a lower ESR, and an excellent high frequency property.

EXAMPLE

The following description is directed to specific examples. However, the embodiments of the present invention are not limited to the following examples.

Example 1

In the present example, aluminum was used as a valve-action metal for an anode, an aluminum foil with carbon implanted in its surface as a cathode metal foil, and polythiophene as an electroconductive polymer.

Both surfaces of a part (3 mm×3.5 mm) of a roughened surface of the aluminium foil except for a lead part were anodized at a formation voltage of 8V, so that a dielectric oxide coating layer was formed. Afterward, a solid electrolyte pre-coat layer was formed with polythiophene on the whole surface of the dielectric oxide coating layer, including the surfaces inside pores, by chemical polymerization through immersion in a solution containing a thiophene monomer and a dopant and immersion in an oxidizing solution. Furthermore, polythiophene was formed on the pre-coat layer by electrolytic polymerization and thus a solid electrolyte layer was formed. Next, a part (3×5 mm$^2$) of the aluminum foil with the surface (3×10 mm$^2$) including carbon implanted therein was used as a lead part, and electroconductive polymer polythiophene was formed on the aluminum foil surface (3×5 mm$^2$) except for the lead part by electrolytic polymerization, so that a cathode was formed. The electrolyte used in this case contained binder resin.

The polythiophene formed on the dielectric oxide coating layer and on the aluminum foil surface with carbon implanted therein was softened with a softener. Thus, a capacitor element for evaluation was obtained. Glycerin with a melting point of 17° C. and a boiling point of 290° C. was used as the softener. The impregnation process was carried out as follows: anode and cathode foils with polythiophene formed thereon were immersed for 20 minutes in a solution prepared by dissolution of 10 wt. % glycerin in ethanol, and then the anode and cathode foils were removed and were heated to 60° C., so that the ethanol was evaporated.

Figure 2:
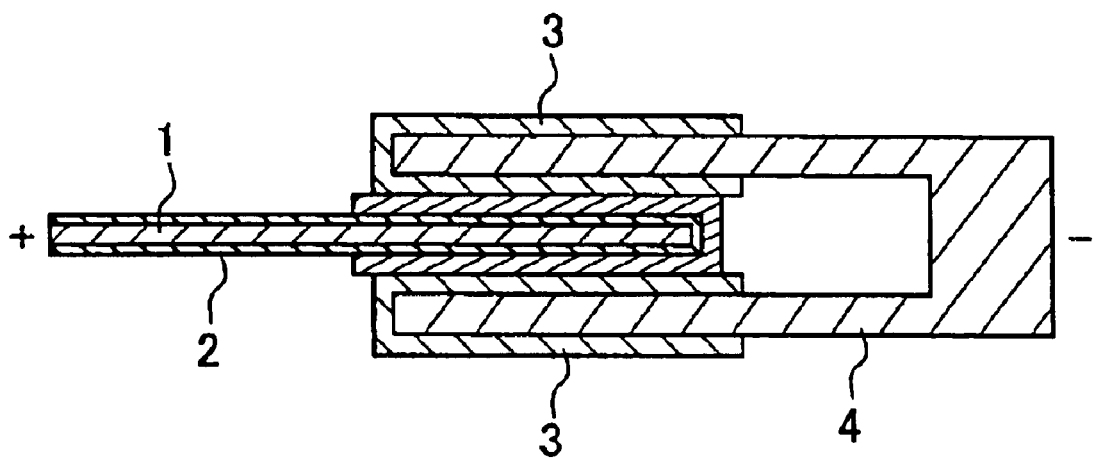
FIG. 2 is a schematic sectional view showing a configuration of a capacitor element part of a solid electrolytic capacitor according to an embodiment of the present invention.

Afterward, a capacitor element for evaluation was assembled. FIG. 2 shows a schematic view of the capacitor element for evaluation. In FIG. 2, numeral 1 indicates an aluminum anode foil as an anode body, numeral 2 a dielectric oxide coating, numeral 3 an electroconductive polymer, and numeral 4 a cathode metal foil. Terminals of two cathode metal foils serving for extracting a cathode were subjected to resistance welding. The contact area between the anode and cathode was 21 mm$^2$.

The evaluation results are described later.

Example 2

Polythiophene was formed by electrolytic polymerization on a dielectric oxide coating layer and on an aluminum foil surface with carbon implanted therein. In this example, for the formation of the polythiophene, an electrolyte containing no binder resin was used in the electrolytic polymerization and in addition, an electroconductive polymer was not softened with glycerin. Thus, a capacitor element for evaluation like the one in Example 1 was produced. The evaluation results are described later.

Example 3

A capacitor element for evaluation was obtained by the same method as in Example 1 except that the polythiophene formed on the dielectric oxide coating layer and on the aluminum foil surface with carbon implanted therein by electrolytic polymerization was formed using an electrolyte containing no binder resin in the electrolytic polymerization, and the polythiophene thus formed was softened with glycerin. As the impregnation process, the same process as in Example 1 was carried out. The evaluation results are described later.

Comparative Example 1

A conventional capacitor element was obtained by the same method as in Example 1 without using the glycerin as the softener. The evaluation results are described later.

Evaluation Results

Each ESR of the capacitor elements for evaluation according to Examples 1 to 3 and Comparative Example 1 was measured by a measuring instrument, IMPEDANCE/GAIN-PHASE ANALYZER (4191A, manufactured by Yokogawa Hewlett-Packard) with the connection portion in each capacitor element pressurized.

Figure 3:
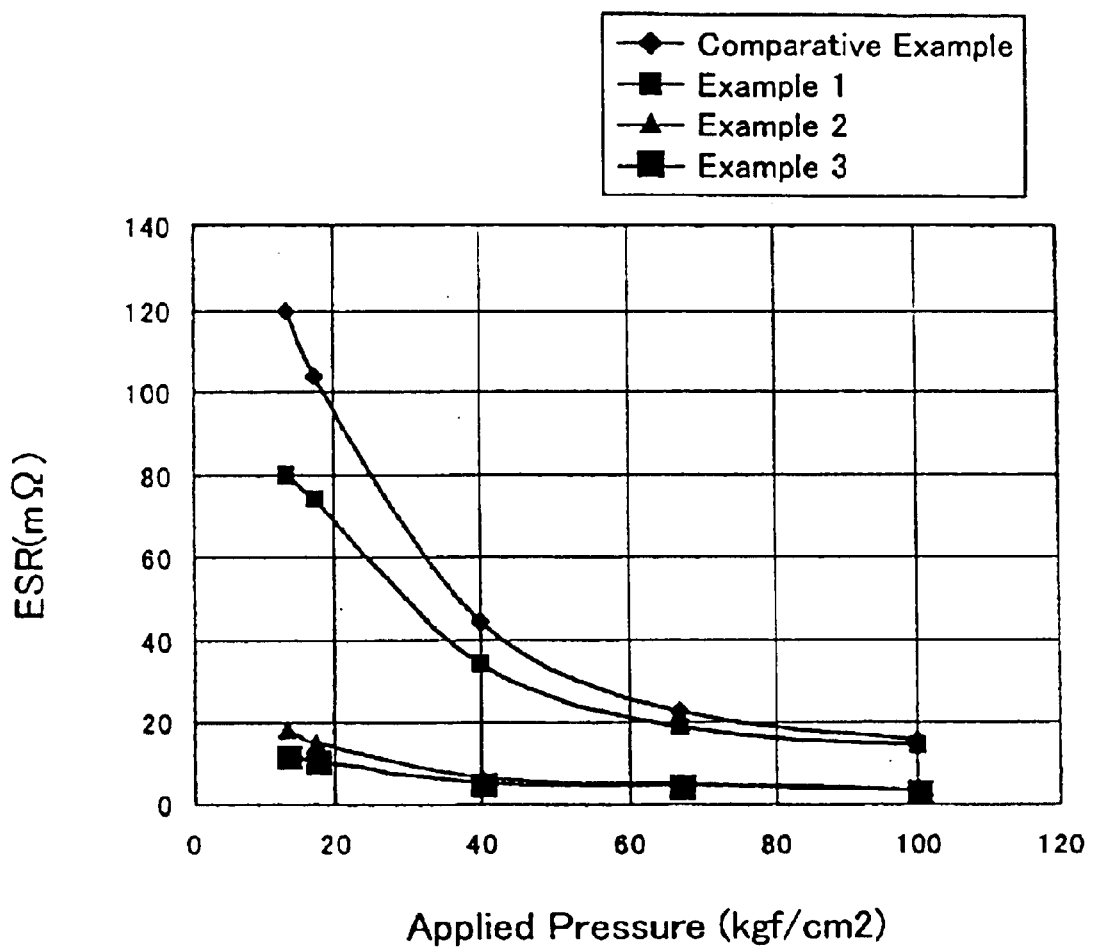
FIG. 3 is a graph showing the relationship between equivalent series resistance (ESR) and a pressure applied to an anode-cathode connection portion in a capacitor element for evaluation according to an example of the present invention.

FIG. 3 shows the measurement results. The ESR values shown in FIG. 3 were measured at 400 kHz. The ESR of the capacitor element for evaluation according to Example 1 that included an electroconductive polymer layer softened with glycerin is lower than that of the capacitor element for evaluation according to Comparative Example 1. Particularly, this tendency is found clearly in the low applied pressure range. In addition, the capacitor elements for evaluation according to Examples 2 and 3 including polythiophene formed using the electrolyte containing no binder resin by electrolytic polymerization have a significantly lower ESR than those of the capacitor elements for evaluation according to Example 1 and Comparative Example 1.

In other words, as compared to the case of Comparative Example 1, Example 1 shows an effect of lowering the ESR by an addition of glycerin and furthermore, Examples 2 and 3 show an effect of lowering the ESR by using an electrolyte free from the binder resin.

Figure 4A:
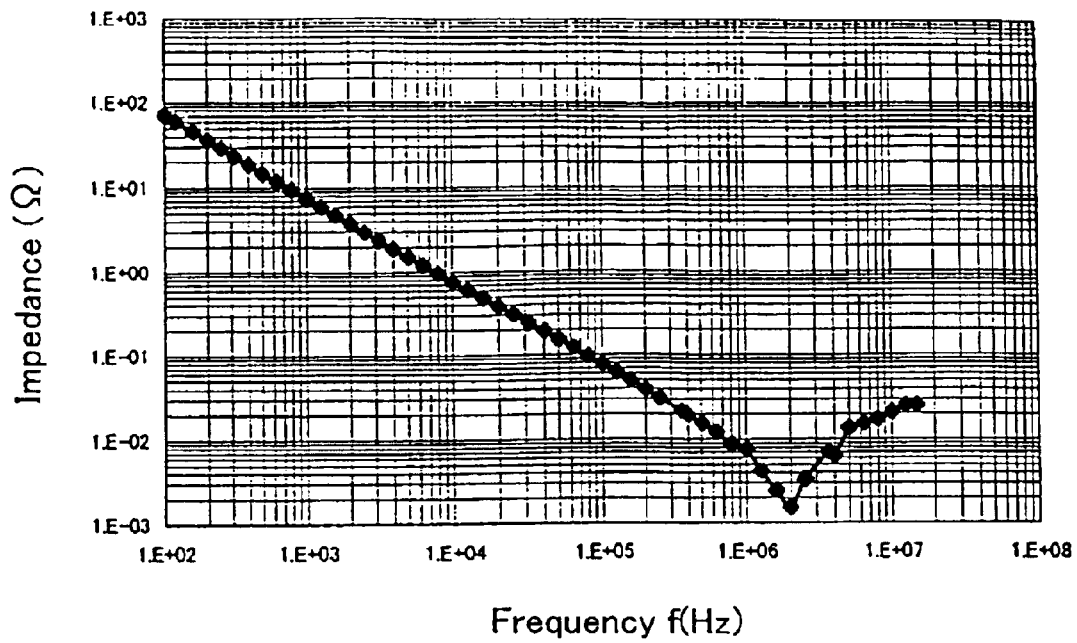
FIGS. 4A and 4B are graphs showing examples of frequency characteristics with respect to the impedance and capacitance of the solid electrolytic capacitor according to Example 3 of the present invention, respectively.
Figure 4B:
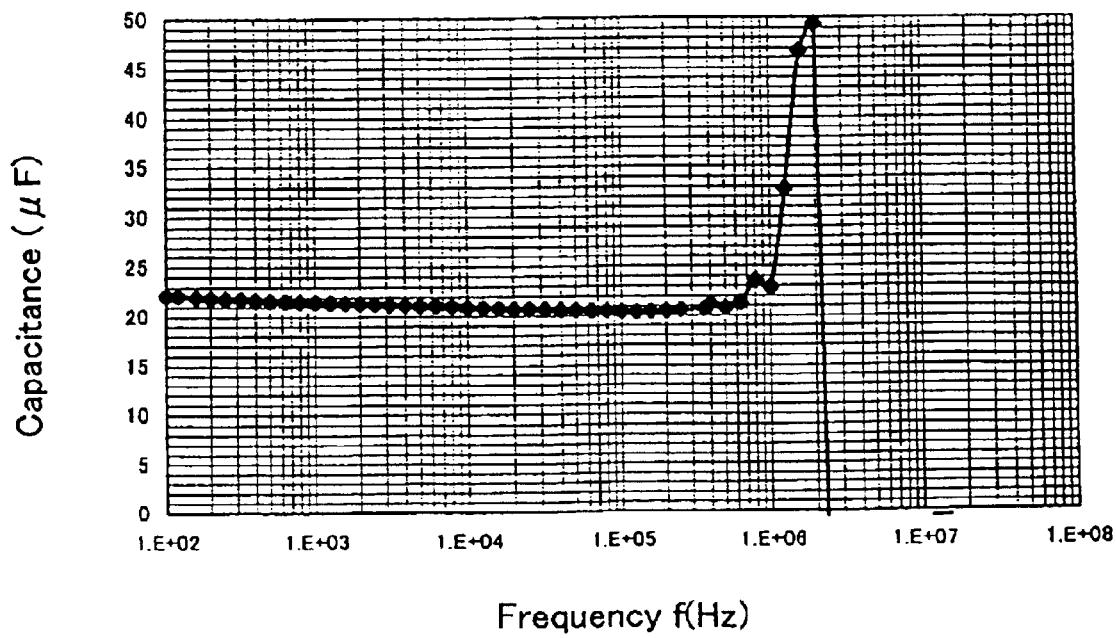
Figure 5:
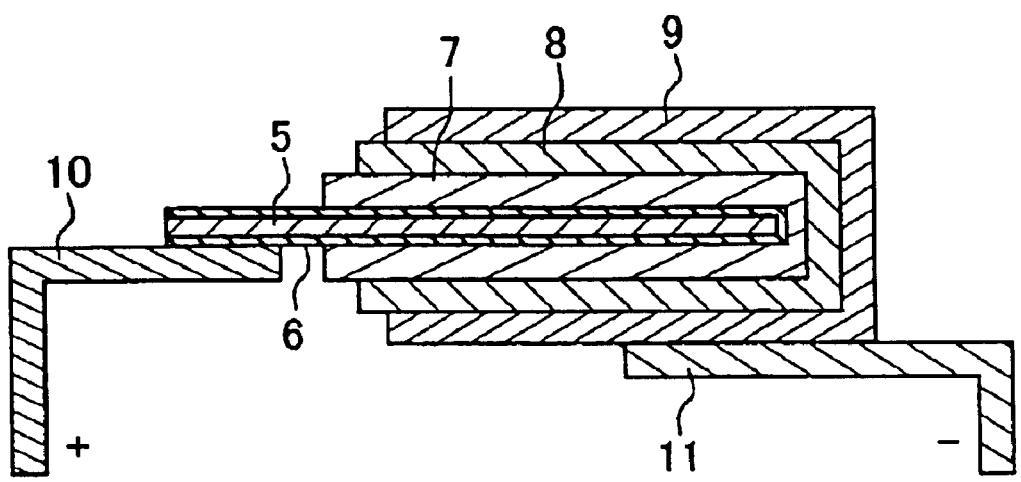
FIG. 5 is a sectional view showing an example of a configuration of a conventional solid electrolytic capacitor with a valve-action metal used for an anode.

In the capacitor elements for evaluation of Example 2 and Comparative Example 1, partial peeling off of polythiophene was observed. However, no peeling off was observed in the solid electrolytic capacitors according to Examples 1 and 3 including polythiophene softened with glycerin. FIGS. 4A and 4B show frequency characteristics with respect to impedance and capacitance of the capacitor element for evaluation according to example 3 under a pressure of about 100 kgf/cm$^2$ under which the lowest ESR was obtained, respectively. Similarly from FIGS. 4A and 4B, it can be seen that the capacitor element according to Example 3 has a very low impedance and is excellent in high frequency property.

As is apparent from the experimental results described above, it was confirmed that as in Example 3, a solid electrolytic capacitor with a very low ESR and an excellent high frequency property in which the electroconductive polymer was not peeled off from electrode foils was obtained through the combination of the characteristics of Examples 1 and 2, i.e. the combination of the softening with glycerin and the use of an electrolyte free from the binder resin.

As described above, the present invention can provide an excellent solid electrolytic capacitor having a very low ESR and causing very small variations in ESR among samples. According to the present invention, the pressure applied to the connection portion during the formation of a package can be reduced. The above-mentioned examples were described with the aluminum solid electrolytic capacitor, but the present invention also can be applied to a tantalum solid electrolytic capacitor.

Furthermore, polythiophene was used as the solid electrolyte in the examples. However, the same effect as in the present examples also can be obtained using other electroconductive polymers.

Moreover, an aluminum foil with a surface including carbon implanted therein was used as the cathode metal foil in the above-mentioned examples. However, the same effect as in the present examples also can be obtained using other metal foils.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method of manufacturing a solid electrolytic capacitor comprising an anode body formed of a valve-action metal with a dielectric oxide coating layer formed on its surface, a cathode body, and an electroconductive polymer layer disposed between the anode body and the cathode body, the method comprising:

forming an electroconductive polymer layer on at least one electrode body selected from the anode body and the cathode body;

impregnating the electroconductive polymer layer with a softener to soften the electroconductive polymer layer, the softener being diluted with a low-boiling-point solvent; and evaporating the low-boiling-point solvent, wherein the softener has a boiling point of at least 200° C. under a normal atmospheric pressure.

2. The method of manufacturing a solid electrolytic capacitor according to claim 1, wherein the low-boiling-point solvent has a boiling point not exceeding 150° C. under a normal atmospheric pressure.

3. The method of manufacturing a solid electrolytic capacitor according to claim 1, wherein the low-boiling-point solvent is at least one selected from the group consisting of methyl alcohol, ethanol, isopropyl alcohol, acetone, toluene, and xylene.

4. The method of manufacturing a solid electrolytic capacitor according to claim 1, wherein the low-boiling-point solvent has an evaporating temperature not exceeding 150° C. under a normal atmospheric pressure.

5. The method of manufacturing a solid electrolytic capacitor according to claim 1, wherein the softener has a boiling point of at least 240° C. under the normal atmospheric pressure.

6. The method of manufacturing a solid electrolytic capacitor according to claim 1, wherein the softener is at least one selected from the group consisting of polyhydric alcohols, fatty alcohols, aromatic alcohols, phenols, and ethers.

7. The method of manufacturing a solid electrolytic capacitor according to claim 6, wherein the softener is at least one selected from the group consisting of glycerin, diethylene glycol, 2-anilinoethanol, m-methoxyphenol, and ethylene glycol monobenzyl ether.

8. The method of manufacturing a solid electrolytic capacitor according to claim 1, wherein the softener is blended in a ratio of 5.0 wt. % in the electroconductive polymer layer.

9. A method of manufacturing a solid electrolytic capacitor comprising an anode body formed of a valve-action metal with a dielectric oxide coating layer formed on its surface, a cathode body, and an electroconductive polymer layer disposed between the anode body and the cathode body, the method comprising:

forming an electroconductive polymer layer on at least one electrode body selected from the anode body and the cathode body;

impregnating the electroconductive polymer layer with a softener to soften the electroconductive polymer layer, the softener being diluted with a low-boiling-point solvent; and evaporating the lower-boiling-point solvent, wherein the softener is blended in a ratio of 5.0 wt % in the electroconductive polymer layer.

10. The method of manufacturing a solid electrolytic capacitor according to claim 9, wherein the low-boiling-point solvent has a boiling point not exceeding 150° C. under a normal atmospheric pressure.

11. The method of manufacturing a solid electrolytic capacitor according to claim 9, wherein the low-boiling-point solvent is at least one selected from methyl alcohol, ethanol, isopropyl alcohol, acetone, toluene, and xylene.

12. The method of manufacturing a solid electrolytic capacitor according to claim 9, wherein the low-boiling-point solvent has a drying temperature not exceeding 150° C. under a normal atmospheric pressure.

13. The method of manufacturing a solid electrolytic capacitor according to claim 9, wherein the softener has a boiling point of at least 200° C. under a normal atmospheric pressure.

14. The method of manufacturing a solid electrolytic capacitor according to claim 13, wherein the softener has a boiling point of at least 240° C. under the normal atmospheric pressure.

15. The method of manufacturing a solid electrolytic capacitor according to claim 9, wherein the softener is at least one selected from polyhydric alcohols, fatty alcohols, aromatic alcohols, phenols, and others.

16. The method of manufacturing a solid electrolytic capacitor according to claim 15, whrein the softener is at least one selected from glycerin, diethylene glycol, 2-anilinoethanol, m-methoxyphenol, and ethylene glycol monobenzyl ether.

* * * * *